United States Patent [19]

Arter et al.

[11] Patent Number: 4,823,330
[45] Date of Patent: Apr. 18, 1989

[54] FOCUS SERVO LOOP OFF-SET COMPENSATION

[75] Inventors: Nelson K. Arter; Mark G. Call; Mark L. Rhoades, all of Longmont, Colo.

[73] Assignee: International Business Machines Corporation, Armonk, N.Y.

[21] Appl. No.: 52,128

[22] Filed: May 4, 1987

Related U.S. Application Data

[63] Continuation of Ser. No. 698,518, Feb. 4, 1985, abandoned.

[51] Int. Cl.$^4$ .................................................. G11B 7/12
[52] U.S. Cl. ...................................... 369/45; 250/201; 369/46; 369/54
[58] Field of Search ....................... 369/44, 45, 46, 54; 250/201

[56] References Cited

U.S. PATENT DOCUMENTS

| | | | |
|---|---|---|---|
| 4,059,841 | 11/1977 | Bricot et al. | 358/128 |
| 4,163,149 | 7/1979 | Sawano et al. | 250/204 |
| 4,190,775 | 2/1980 | Sakuru | 369/44 |
| 4,243,848 | 1/1981 | Utsumi | 369/45 |
| 4,357,696 | 11/1982 | Bierhoff et al. | 369/45 |
| 4,365,324 | 12/1982 | Michaelis | 369/44 |
| 4,368,525 | 1/1983 | Harigae et al. | 369/45 |
| 4,368,526 | 1/1983 | Harigae et al. | 369/45 |
| 4,509,156 | 4/1985 | Ohara et al. | 369/54 |
| 4,607,157 | 8/1986 | Millar et al. | 250/201 |
| 4,658,391 | 4/1987 | Nogu | 369/45 |
| 4,661,944 | 4/1987 | Shiys | 369/44 |
| 4,663,750 | 5/1987 | Hamanaba | 369/45 |

FOREIGN PATENT DOCUMENTS

| | | | |
|---|---|---|---|
| 3048708 | 10/1981 | Fed. Rep. of Germany | 369/45 |
| 3227654 | 2/1983 | Fed. Rep. of Germany | 369/45 |
| 2325987 | 4/1977 | France | 369/45 |
| 2360150 | 2/1978 | France | 369/45 |
| 53030 | 3/1983 | Japan | 369/45 |

OTHER PUBLICATIONS

Patent Abstracts of Japan vol. 8, No. 65 (p. 263) 3/27/84.
Patent Abstracts of Japan vol. 7, No. 180 (P. 215) 8/9/83.
Patent Abstracts of Japan, vol. 7, No. 138 (p. 204) 6/16/83.
Patent Abstracts of Japan, vol. 7, No. 234 (p. 230) 10/13/83.
Patent Abstracts of Japan, vol. 8, No. 97 (p. 272) 5/8/84.

*Primary Examiner*—Steven L. Stephan
*Attorney, Agent, or Firm*—Carl M. Wright

[57] ABSTRACT

Error compensation in a feedback servo system. The feedback servo loop in, for example, a head positioning circuit in an optical disk data recording and retrieval system is provided with a compensation signal to correct for misalignment or other errors. The head in such a system must be dynamically maintained at a best focus position but, through use and transporting, the alignment of the head position error detecting system can be disturbed. In some cases, the loop circuit parameters may drift from their original values. To correct for errors introduced from such causes, the head is positioned at best focus and the focus error (head position error) signal is sensed. A correction signal is supplied which cancels out the sensed value while the system is operating.

2 Claims, 4 Drawing Sheets

FIG. 2B    FIG. 2A    FIG. 2C
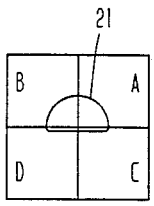
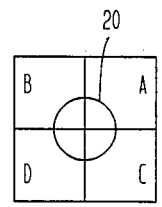
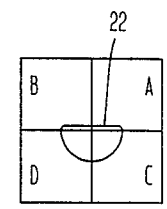
FIG. 3
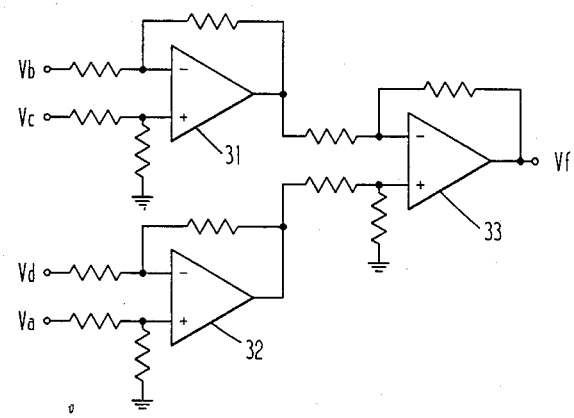
FIG. 4A    FIG. 4B
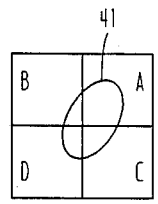
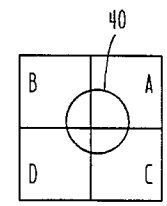

FOCUS SERVO LOOP OFF-SET COMPENSATION

This application is a continuation of U.S. Ser. No. 698,518, filed on Feb. 4, 1985, now abandoned.

DOCUMENTS INCORPORATED BY REFERENCE

U.S. Pat. No. 4,059,841 is incorporated herein by reference and shows a feedback focus control loop using quadrature diodes and the establishment of best focus by detection of the maximum value of a differentiated read signal.

1. Technical Field

This invention relates to servo loop control compensation and particularly to compensation in servo loops used by optical disk readers to maintain a light beam at best focus.

Focus servo loop parameters change with time and use, causing the focusing system to servo to something other than best focus. The parameters most subject to change are the alignment of the optical paths associated with the quadrant diode detectors, gain of the diode signal preamplifiers, the laser beam profile, and overall response caused by foreign material contaminating the optical path.

1. Background Art

A quadrature diode detector technique is commonly used in optical reader heads to sense the laser or light beam reflected from the storage medium. Amplified output signals from the diodes are used to control the focus servo system to keep the laser dynamically focused on the medium. Close control of the focus in optical disk readers is necessary because the surface of the media has large runout relative to the one micron information bit size and the depth of field of the objective lens.

U.S. Pat. No. 4,368,526 shows a comparator for detecting the maximum peak of a differentiated read signal to establish the best focus in an open loop circuit. When the best open loop focus is established, the focus control loop is closed to operate as a servo loop using a quadrant diode detecting scheme.

U.S. Pat. No. 4,243,848 shows a focus controller using photodetectors disposed at one of the conjugate planes of the converging lens and others on the focal plane of the objective lens. The diodes are aligned in a direction corresponding to the movement of the images of the information bits as they are read. Using a phase relationship among the photodiode signals, a drive coil is controlled to maintain the light beam at best focus on the disk.

U.S Pat. No. 4,059,841, incorporated herein by reference, is directed to the use of four diodes arranged in quadrature to detect a projected quasi-punctiform spot for providing feedback to a focus control circuit.

U.S. Pat. No. 4,163,149 is directed to the correction of a focus control signal error component caused by tracking offsets. It uses quadrature diodes to provide a focus control signal derived from the difference of opposed diode signals and a compensation signal from the sum of adjacent diode signals. That is, a correction signal is supplied to compensate for the lateral movement of the focus circle on the diodes due to the action of the tracking movement.

U.S. Pat. No. 4,190,775 (Sakurai et al.) discloses an optical memory playback apparatus using an electroluminescent semiconductor element as both the source of light and the sensor. The semiconductor element is a three-mirror resonator constructed from an outer mirror and a laser element. Information is stored in the form of variations in the reflection factor of the outer mirrors and is read out by allowing the variation in the light output, viz., the presence or absence of oscillation, directed onto the semiconductor element which also acts as the sensor.

The prior art references do not show, teach, or suggest the subject matter of this invention, viz., compensating for errors in the forms servo system caused by misalignment, aging, or other causes of variation in the loop parameters.

DISCLOSURE OF THE INVENTION

In accordance with the present invention, a servo loop provides focusing compensation by furnishing a bias offset signal to the focus control signal, the magnitude being determined by sensing the focus error signal when the optical system is known to be at best focus. If the latter is not zero, a compensating signal of the same magnitude is subtracted from the error signal to force the resulting servo error signal to zero when the position of best focus is maintained.

An optical disk data storage with a head having a lens arrangement for focusing a beam of radiant energy includes means for adjusting the focus and a servo loop for keeping the head at the best focus position. An indication is provided when the head is at its best focus position and the error signal is sensed in response to the indication signal. A correction signal is supplied having a magnitude equal to the error signal at best focus and is combined with the error signal to cancel out the sensed value.

Among the advantages of the invention to be described is improvement of the focus servo system reliability. It adaptably removes error signal tolerance variations caused by aging, wear, and tear, or misalignment. The system of the invention is simple and economical, adaptable to microprocessor control and shared circuitry which can be used with other parts of the system. It is usable with a wide range of error correction feedback schemes.

BRIEF DESCRIPTION OF THE DRAWING

FIGS. 2A–C are an illustration of the beam shape that falls on the quadrature diode detectors at various lens distances from the media.

FIG. 3 is a schematic of a typical focus error signal generator.

FIGS. 4A–B are illustrations of the beam shapes falling on the quadrature diodes when the optical path is out of alignment.

DETAILED DESCRIPTION

A background explanation of the operation of the prior art focus system is first discussed to provide a clear understanding of the invention.

Figure 1:
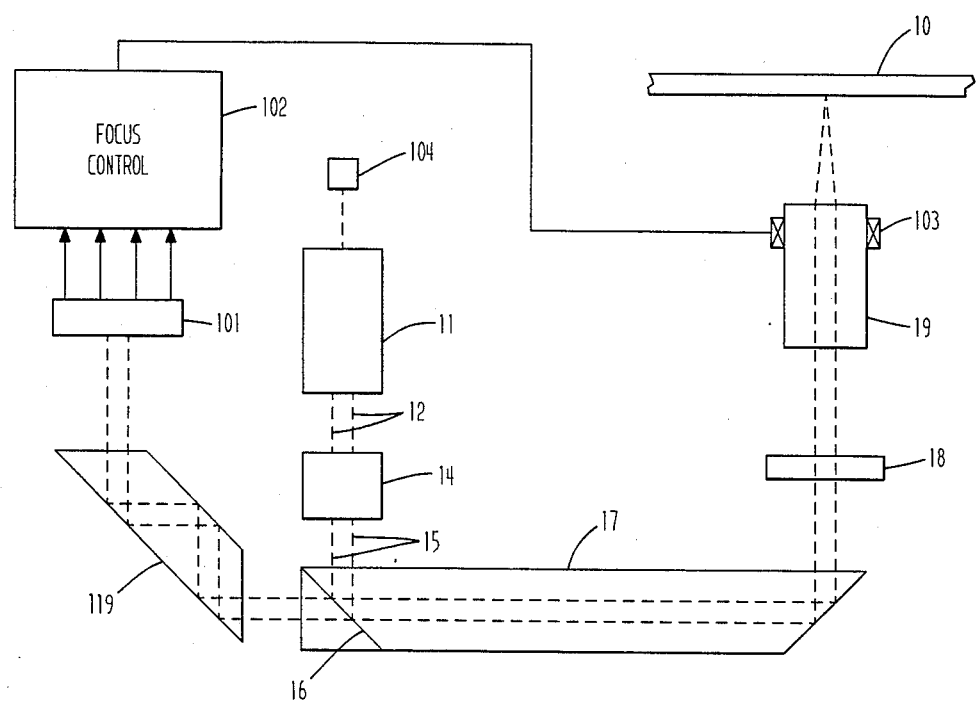
FIG. 1 is a representation of lens and detection arrangement for an optical disk reading or recording system.

An optical system for a typical optical disk reader is illustrated in FIG. 1. A suitable source of light energy, typically a solid state laser 11, generates a beam of light energy 12 which is passed through a collimator lens system 14 to form a collimated beam 15.

The collimated beam 15 is directed to a polarizing prism 17 which includes a beam splitter 16. The beam 15 is thereby directed to the right and up through a quarter wave plate 18, circularly polarizing the beam, which is then passed through an object lens system 19 to focus on the reflective surface 10 of an optical disk.

The light reflected from the disk surface 10 is passed back through the object lens 19 and through the quarter wave plate 18 to the polarizing prism 17. The beam splitter 16 allows a portion of the reflected beam to pass through the end of the polarizing prism 17 to a critical angle reflecting prism 19 which directs the portion of the reflected beam onto quadrature diodes 101. The output signals from the quadrature diodes 101 are coupled to a focus control unit 102 which supplies a drive signal to an object lens focus actuator 103. The laser beam is designed to be at best focus on the surface 10 when the drive signal has a value of zero, although this is not a necessary requirement.

A monitor diode 104 detects a portion of the laser beam reflected from the beam splitter 16 back through the collimator lens 14 and through the solid state laser 11. The monitor diode 104 supplies a feedback control signal (not shown) that maintains the laser output power at a constant, predetermined value.

The portion of the reflected laser beam from the optical disk surface 10 being read is directed onto a quadrature diode arrangement 101 shown in FIG. 2. Because of the lens arrangement and beam polarization, when the beam is focused on the disk surface 10, the reflected beam is a circle centered at the common junction point of the diodes. For example, in FIG. 2A, a reflected circular beam 20 is centered at the common junction point of four photodiodes A, B, C, and D. As a result, each of the photodiodes A-D receives an equal amount of energy and the voltage output signal from each diode is equal.

When the beam is not at best focus on the optical disk surface 10, the polarization and lens arrangement causes the beam shape to become a semicircle as illustrated in FIGS. 2B and 2C. When out of focus in a certain direction, e.g., toward, a beam 21 is positioned so that the photodiodes A and B receive more energy than the photodiodes D and C as illustrated in FIG. 2B.

When the beam is out of focus in the other direction, e.g., away, the beam again becomes semicircular. The out-of-focus-away situation is illustrated as the semicircle 22 in FIG. 2C, positioned so that the photodiodes D and C receive more energy from the beam than do the photodiodes A and B.

A focus correction signal can be derived as $Vf=(Va+Vb)-(Vd+Vc)$ where Va is the voltage output signal from the photodiode A; Vb, from the photodiode B; Vc, from the photodiode C; and Vd, from the photodiode D.

When $Vf=0$, which would be the result when the beam is circular and centered as shown in FIG. 2A, the beam is at best focus. That is, when the system is operating correctly, $Vf=0$ when the reading laser beam is at best focus on the optical disk surface 10.

When the beam is out of focus in the toward direction to cause the beam on the photodiodes to appear as shown in FIG. 2B, the signal Vf will be some non-zero positive value. When out of focus in the other direction, i.e., the situation shown in FIG. 2C, the signal Vf will be some negative value.

The laser beam object lens system 19 is mounted in a frame that is movable in either direction perpendicular to the focusing plane which, in the illustrative system being described, is defined by the disk surface 10. Such a system can use an electrical linear motor positioned as shown in FIG. 1 as the object lens focusing actuator 103. The focus signal, Vf, represents the focus drive signal to keep the beam in focus. That is, when Vf is positive, the lens system 19 is offset in one direction and when Vf is negative, the lens system 19 is displaced in the other direction.

A suitable focus control 102 is illustrated in FIG. 3. The focus voltage, Vf, equal to $Va+Vb-(Vd+Vc)$, can be rearranged to $$Vf=(Va-Vd)-(Vc-Vb) \tag{1}$$

to take advantage of commercially available difference amplifiers.

Equation (1) is implemented by the circuit illustrated in FIG. 3. The difference amplifiers 31-33 are coupled as shown using resistors having proper values which can readily be determined by one of ordinary skill in the art. The circuit output signal, Vf, is coupled to the focus actuator 103 to supply a signal having the polarity and magnitude necessary to keep the laser beam at best focus on the disk surface 10 in the presence of run-out in the disk.

More detailed explanations of the above-described prior art focus adjustment systems are found in U.S. Pat. Nos. 4,163,149 and 4,368,526.

A problem with this prior art system for keeping the laser beam in focus is that misalignmant of the optical system can cause errors. For example, if the optical system is mialigned, the beam may not center on the diodes. This will cause the feedback correction signal, Vf, to be other than zero when the beam is at best focus. Another cause of error is change in circuit parameters, e.g., drift in the off-set voltages or gain of the difference amplifiers, or change in resistor values.

Misalignment of parts of the optical system or drift in circuit parameter values will preclude the servomechanism of the focusing system from keeping the beam in best focus. FIG. 4 illustrates the situation where the optics have been misaligned so that the circle 40 produced at best focus does not fall on all diodes equally. As shown, the circle 40 in FIG. 4B will produce a focus actuator drive signal as if the system were out of focus in the toward direction. That is, the value of Va+Vb will exceed that of Vd+Vc. Therefore, the quality of the read signal will degrade to the point of being nonfunctional. Similarly, the ellipse 41 in FIG. 4A will not produce the signal necessary to correct the corresponding out-of-focus condition.

The invention to be described and illustrated below is directed to applying a correction to the focus drive signal when errors such as those described above begin to affect the accuracy of the focusing system.

Adaptive focus error compensation requires some indication of optimum focus separate from the primary loop so that focus error signal misadjustment can be corrected. In addition to the maximum data indicator method, several other techniques are practical, all of which have been successfully used.

An optically aligned head results in a DC voltage peak of either polarity, depending on amplifier inversions, of the data signal, which is the four-quadrant signal summed, when at best focus. This peak may be sensed as a best focus indicator.

In a second method, a test area of a track is reserved for best focus testing and written under varying conditions of focus. Optimum write focus, which tends to be a more critical indicator than read focus, can then be determined from the resulting written area based on correlation with a known applied offset correction.

In a method with grooved or otherwise prewritten media, such as stamped grooveless data disks, track crossing signals occur prior to closing of the track-following loop. This signal may be utilized for best focus determination in at least two ways. The simplest of these, applicable to all types of tracks, is to look for a peak signal level as with the summed DC data signal. Grooved media produce a tracking signal with a "dog leg" as the laser spot tracks open-loop over the groove and land areas. This dog leg is a sensitive indicator of actual focus. When it is flattest or demonstrating a slight negative slope (depending on groove width, optical alignment, detector gains, and properly located with respect to signal peaks), the head is servoed to best focus. This best focus dog leg detection can be accomplished by digitizing the tracking error signal followed by an identification of the inflection points. After differentiation, locations of consecutive positive and negative peaks in time are compared, using amplitude comparators to separate major and minor peaks, simplifying timing logic for interpretation for identifying dog leg duration. This is described in more detail in U.S. Pat. No. 4,059,841, incorporated herein by reference.

Another method depends on the fact that best focus corresponds to minimum laser spot size. Read back signals, such as tracking or data, will exhibit best edge definition at this point. That is, the signals will have the fastest rise and fall times at focus. Several types of rise and fall time comparison circuits can be envisioned; one possibility which can be easily implemented is differentiation of the selected signal which at best focus which results in the peak value of the derivative.

An optical technique employing track crossings for information and best focus compensation might effectively use a combination of the aforementioned techniques. Experiments have shown that the best focus derived from a maximization of dog leg or peak derivative while simultaneously maintaining peak signal amplitude provides ample performance. This approach is particularly valuable because other variables, such as mechanical runout on the disk, bearings or track grooves, reflectance variations, optical misalignments, and so on, result in modulation of the signal around the media circumference. Integration of the key indicators over a single revolution is desirable.

Figure 5:
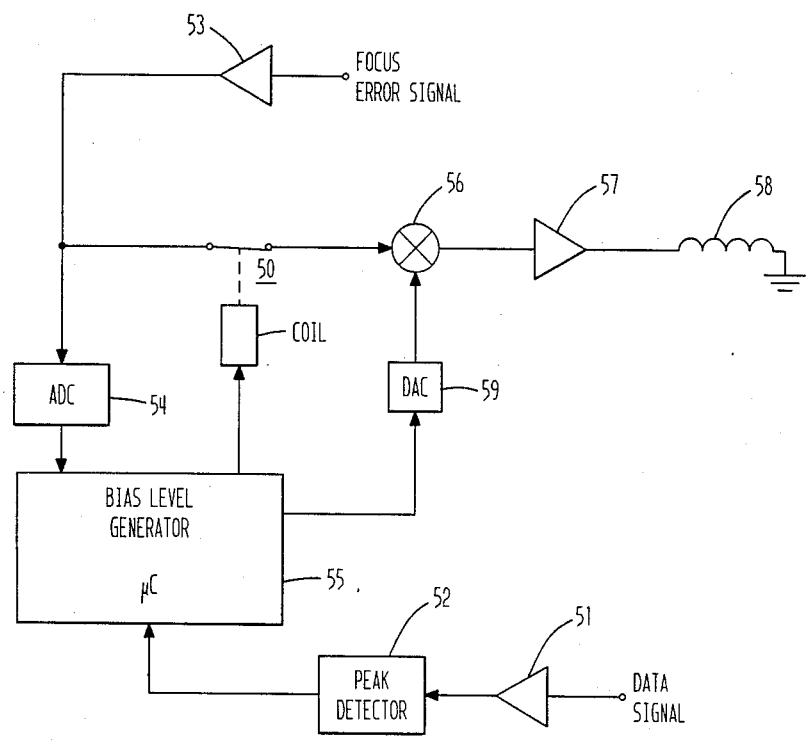
FIG. 5 is a schematic of a focus control system according to the invention.

FIG. 5 illustrates a preferred embodiment of the invention. All the devices used are well known in the art and are commercially available.

In the system shown in FIG. 5, the data signal is received and amplified by a data amplifier 51. The output signal from the data amplifier 51 is coupled to the input of a peak detector 52, which produces an output signal when the amplified data signal reaches its peak value, to the bias level generator 55, which is preferably an appropriately programmed microcomputer.

The focus error signal is received by an amplifier 53 and the amplified focus error signal is coupled to the bias level generator 55 through an analog-to-digital converter 54. The amplified focus error signal is also coupled to a mixer 56, the output supplying a signal via a focus amplifier 57 to the focus actuator 58. The other input to the mixer 56 is an output signal from the bias level generator 55 through a digital-to-analog converter 59.

A switch 50 is controlled by the bias level generator 55 to decouple the focus error signal from the mixer 56.

Figure 6:
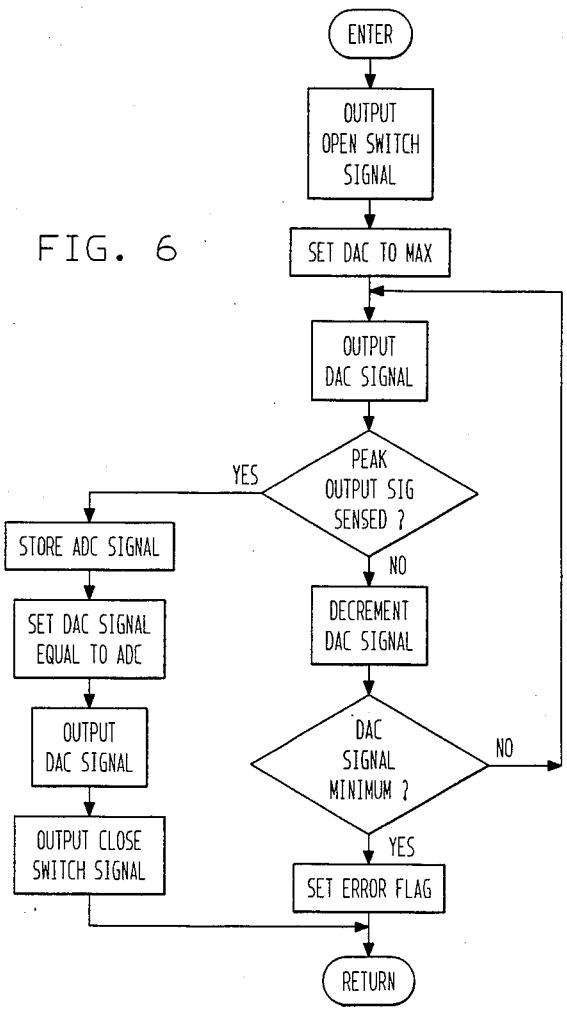
FIG. 6 is a flowchart of a program for controlling the microcomputer of FIG. 5.

The focus actuator 58 operates the lens focusing system as shown in FIG. 1. The program for controlling the microcomputer comprising the bias level generator 55 is shown in the flow chart in FIG. 6.

This program operates the bias level generator as follows. Initially, the switch 50 is opened, typically by a coil as in a relay as shown or using a solid state switch, and the output signal via the DAC 59 is used to position the focus actuator at one limit of its travel. The output signal to the DAC 59 is then driven to the other limit in a stepwise fashion while the amplified focus error signal is sensed by the bias level generator 55 via the ADC 54.

When the peak detector 52 indicates that the data signal has reached a peak, it supplies a signal to the bias level generator 55. When it is sensed, the value of the output signal from the ADC 54 is stored.

The program then causes the bias level generator to supply an output value to the DAC 59 which has the same amplitude as the focus error signal stored at the occurrence of the data signal peak. The polarity of the output signal from the DAC 59 is, however, opposite from that of the stored focus error signal. Alternatively, the polarities of the two signals to the mixer can have the same polarities provided that the mixer 56 is of the subtractive type.

The switch 50 is then closed so that both signals are coupled to the mixer 56. By providing an opposite polarity but equal signal to the mixer 56 from the DAC 59, the undesired error in the focus error signal is cancelled and the output signal from the mixer 56 has a value of zero when the lens system is positioned at best focus.

The program can also be represented by a design language from which programmers of ordinary skill in the art can write the program details for use on the particular microcomputer used to implement the invention. The choice of a suitable microcomputer is within the skill of the art and depends on the speed, capacity, and level of mathematical operations required for the particular system to be implemented. For example, in the presently illustrated embodiment of the invention, operations other than those to practice the invention would probably be implemented using a microcomputer. Such operations would include the timing and generation of command signals to the components comprising the optical reader and sensing input signals necessary for proper operation of the system. For example, a switch would likely be provided to supply a signal that indicates the door through which a disk is placed on the spindle is open. A command received from a processor to position the head and to read the data would entail starting the motor and positioning the head. The first step might be to sense that the door is shut and provide an error indication that the door is open. The operator would have to close the door before the microprocessor would initiate the steps to read the data.

The system might also be used to perform the function of supplying the focus signal, shown in FIG. 3 as an analog system.

The program for implementing the present invention would likely be included as a subroutine which could be invoked automatically when read errors were detected or manually by the operator.

Such applications might require no more computing power and speed than is found in the lower priced, commercially available microprocessors, e.g., a Z80 (Zilog, Inc.), an 8080 (Intel, Inc.), a MC6800 (Motorola, Inc.), or a COSMAC 1802 (RCA Corp.). These microprocessors are well known in the art and the auxiliary devices such as memory, read-only memories, and input-output circuit components are readily available and understood.

Each of the microprocessors uses a different instruction set (although the Z80 and 8080 instruction sets are somewhat compatible). Therefore, the exact program depends on the particular microprocessor used. Program design languages, however, have been used for some time in the art to describe the details of a program in sufficient detail for the implementer to program the particular microprocessor used. These design languages also permit the program to be systematically designed from the top down leaving the details until last by use of functional statements and step-wise refinement. For implementation of the present invention, a suitable program could be written from the following design language.

```
var OPEN_SW, PEAK_IN, ERROR : boolean;
DAC_OUT, ADC_IN :real ;
const MAX, MIN, STEP_VALUE;
/Comments are written between slants/
/The above statements indicate the variables and
constants to be used in the program/
proc FOCUS_CORRECTION;
OPEN_SW := true;
[signal prepared to open switch 50]
write OPEN_SW;
[signal supplied to processor output port]
DAC_OUT := MAX;
[signal prepared to drive focus to one limit]
repeat
[signal to step focus head to other limit and sense
error]
write DAC_OUT;
DAC_IN := DAC_OUT - STEP_VALUE;
read ADC_IN;
until DAC_OUT = MIN or PEAK_IN;
if DAC_OUT = MAX then ERROR := TRUE; return ;
```

```
-continued
[no peak sensed]
DAC_OUT := -1 * ADC_IN; [compensation signal set]
OPEN_SW := false;
write DAC_OUT; [compensation signal sent to mixer]
write OPEN_SW; [switch 50 closed]
return ;
```

While the invention has been particularly shown and described with reference to a preferred embodiment thereof, it will be understood by those skilled in the art that various changes in form and details may be made therein without departing from the spirit and scope of the invention.

What is claimed is:

1. In an optical disc system having
  laser means for supplying energy to read or to write on an optical disc,
  means for focussing said energy at a surface on said disc,
  detecting means for supplying a feedback signal proportional to focussing error, and
  servo means responsive to said feedback signal for maintaining said focussing means at substantially best focus,
  the improvement comprising:
  microprocessor means including
    (1) means for indicating when said focus means is at substantially best focus having
      (a) means for decoupling said feedback signal from said servo means,
      (b) peak detecting means responsive to data read from said optical disc, and
      (c) means for moving said focus from one side of said surface to the opposite side of said surface; and
    (2) means for providing a correction signal having a value equal to the feedback signal value when the focussing means is at substantially best focus having
      (a) means responsive to the peak detecting means for
  storing the value of said feedback signal; and means for offsetting said correction signal from said feedback signal.

2. The apparatus as claimed in claim 1 wherein said offsetting means includes subtractor means located in said servo means for subtracting the value of said correction signal from said feedback signal.

* * * * *